Nov. 10, 1925.

M. S. ANDERSON 1,560,638

COMBINED COTTER PIN AND WASHER

Filed Aug. 9, 1924

Inventor.
Miles S. Anderson,
by Parker + Carter
Attorneys.

Patented Nov. 10, 1925.

1,560,638

UNITED STATES PATENT OFFICE.

MILES S. ANDERSON, OF INDIANAPOLIS, INDIANA, ASSIGNOR TO LINK-BELT COMPANY, OF CHICAGO, ILLINOIS, A CORPORATION OF ILLINOIS.

COMBINED COTTER PIN AND WASHER.

Application filed August 9, 1924. Serial No. 731,233.

*To all whom it may concern:*

Be it known that I, MILES S. ANDERSON, a citizen of the United States, residing at Indianapolis, in the county of Marion and State of Indiana, have invented a certain new and useful Improvement in a Combined Cotter Pin and Washer, of which the following is a specification.

My invention relates to a combined cotter pin and washer. One purpose is to provide an efficient and durable means for prevent the axial withdrawal of a securing pin which joins adjacent rotating elements, for example, adjacent links in a chain. Another object is the provision, association with such securing means, of a relatively extended bearing surface, which distributes over a broad area the wear of the adjacent rotating portions against the cotter element. Other objects will appear from time to time in the course of the specification and claims.

I illustrate my invention more or less diagrammatically in the accompanying drawings, wherein—

Like parts are illustrated by like characters throughout the specification and drawings.

A, A are chain links, the ends of which are perforated to permit the passage therethrough of the securing and bearing pin $A^1$, one end of which is enlarged as at $A^2$. The opposite end of the pin is milled off as at B, B, the milled off portion being perforated as at $B^1$.

Figure 1:
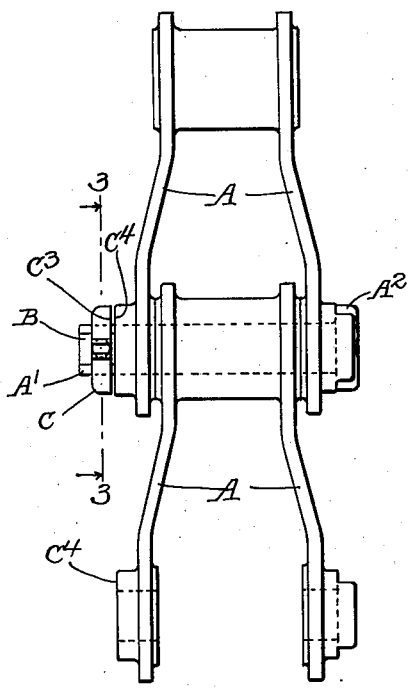
Figure 1 is a plan view of chain links with which my invention is used.
Figure 2:
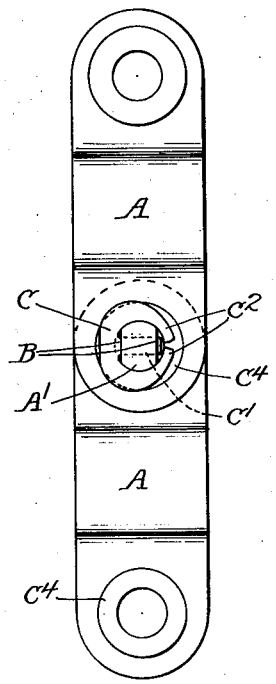
Figure 2 is a side elevation of the links shown in Figure 1.
Figure 3:
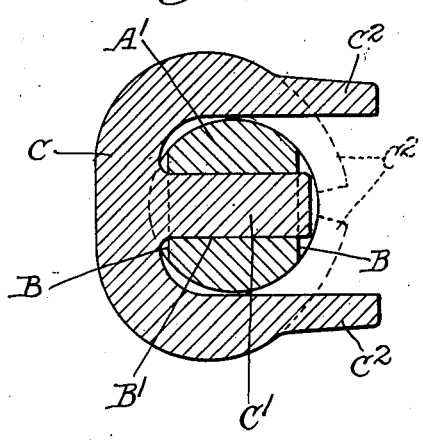
Figure 3 is a section on an enlarged scale along the line 3—3 of Figure 1.
Figure 4:
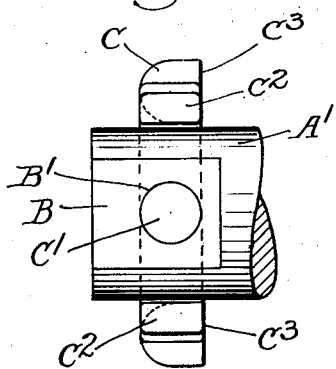
Figure 4 is an enlarged view of an end of the chain pin showing the combined cotter pin and washer in position.

C is the washer body herein shown as generally semi-circular or arcuate and provided with the central pin portion $C^1$ and the projecting arms $C^2$. In use the cotter pin member $C^1$ is inserted into the aperture $B^1$, as shown in Figure 3, and the arms $C^2$ are then hammered or bent into the position shown in dotted lines in Figure 3, thus securely locking the cotter pin against axial movement. The perforation through which the cotter pin passes is so positioned that the flattened surface $C^3$ of the washer is opposed to the adjacent flat surface $C^4$ of the link. The extended washer surface is sufficient to prevent undue wear or battering of the cotter pin, and a durable and efficient and yet easily removed cotter is thus provided.

It will be realized that the combined cotter pin and washer herein shown may be used with a diversity of different parts and its use herein with chain links is intended as illustrative and not as a limitation. While I have shown an operative device, it will be realized that many changes may be made in the size, number, shape, proportion and relation of parts without departing from the spirit of my invention.

I claim:

1. A unit washer and cotter pin comprising a substantially arcuate washer body having a plane bearing surface on one side, a pin projecting inwardly from the center of said washer body, arms projecting from the ends of said washer body said last mentioned arms being substantially longer than said first mentioned pin.

2. A unit washer and cotter pin comprising a substantially arcuate washer body having a plane bearing surface on one side, a pin projecting inwardly from the center of said washer body, arms projecting from the ends of said washer body said last mentioned arms being substantially longer than said first mentioned pin, said arms being adapted to be bent inwardly toward each other and being of such length as to overlie the end of said pin when so bent.

3. A unit washer and cotter pin comprising an arcuate washer body, a pin element projecting from said body, said body terminating in a plurality of arms adapted to be bent about the element through which the cotter pin passes, said arms being substantially longer than said pin.

4. A unit washer and cotter pin comprising a washer body, a pin projecting from said body, flexible, relatively non-resilient securing arms terminating the opposite ends of said washer body and adapted to be bent inwardly toward the outer end of the pin, said arms being substantially longer than said pin.

5. A unit washer and cotter pin comprising a washer body and a pin projecting from said body, said body comprising in part flexible but non-resilient arms, the distance between said arms, prior to the application of the cotter, being at all points equal to or greater than the diameter of the member to which the cotter is to be applied, said arms being adapted to be bent into final position after the application of the cotter pin.

Signed at Indianapolis, county of Marion, and State of Indiana, this 22nd day of July, 1924.

MILES S. ANDERSON.